(12) United States Patent
Yin et al.

(10) Patent No.: US 8,626,849 B2
(45) Date of Patent: Jan. 7, 2014

(54) APPARATUS AND METHOD FOR RESOLVING A RACE CONDITION BETWEEN TWO SESSION INITIATION PROTOCOL (SIP) END POINTS

(75) Inventors: Haiyang Yin, Kitchner (CA); Lap Luu, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 556 days.

(21) Appl. No.: 12/844,172

(22) Filed: Jul. 27, 2010

(65) Prior Publication Data

US 2011/0264746 A1 Oct. 27, 2011

Related U.S. Application Data

(60) Provisional application No. 61/328,400, filed on Apr. 27, 2010.

(51) Int. Cl.
*G06F 15/16* (2006.01)

(52) U.S. Cl.
USPC .............................. 709/206; 709/204; 709/207

(58) Field of Classification Search
USPC ......................................................... 709/206
See application file for complete search history.

(56) References Cited

U.S. PATENT DOCUMENTS

| | | | | |
|---|---|---|---|---|
| 7,509,425 | B1 * | 3/2009 | Rosenberg | 709/227 |
| 2003/0005280 | A1 * | 1/2003 | Bobde et al. | 713/150 |
| 2005/0182995 | A1 * | 8/2005 | Curcio et al. | 714/748 |
| 2006/0142010 | A1 * | 6/2006 | Tom et al. | 455/445 |
| 2008/0022383 | A1 * | 1/2008 | Bobde et al. | 726/10 |
| 2008/0270618 | A1 * | 10/2008 | Rosenberg | 709/228 |
| 2009/0168985 | A1 * | 7/2009 | Yu et al. | 379/202.01 |
| 2009/0285204 | A1 * | 11/2009 | Gallant et al. | 370/352 |
| 2009/0327300 | A1 * | 12/2009 | Khare et al. | 707/10 |

OTHER PUBLICATIONS

SIP: Session Initiation Protocol J. Rosenberg AT&T, Jun. 2002.*
Generalized Third-party Call Control in SIP Netwrok Eric Cheung and Pamela Zave AT&T Labroratories—Research Florham park, NJ 2008.*
European search report—Oct. 4, 2010 from corresponding EP application.
Johnathan Rosenberg—"SIP session initiation protocol . . . " Jan. 28, 2002—p. 77-p. 80.
Generalized Third-Party Call Control in SIP Networks—Eric Cheung and Pamela Zave A T & T Laborataries—Research, white paper.
A T & T Generalized Third-Party Call Control in SIP Networks—Eric Cheung and Pamela Zave A T & T Laborataries—2008.

* cited by examiner

*Primary Examiner* — Tauqir Hussain
(74) *Attorney, Agent, or Firm* — Gowling Lafleur Henderson LLP (57) ABSTRACT

An apparatus and method are described for resolving a glare condition between two SIP endpoints. The method allows a third party call control controller to resolve the glare condition when the ownership status of each dialog is the same, by initiating a back-off period of time at the apparatus based on the ownership status of the SIP dialog and re-sending a re-INVITE message to the end point after expiry of the back-off period of time.

25 Claims, 5 Drawing Sheets

APPARATUS AND METHOD FOR RESOLVING A RACE CONDITION BETWEEN TWO SESSION INITIATION PROTOCOL (SIP) END POINTS

CROSS-REFERENCE TO RELATED APPLICATIONS

This application claims the benefit of U.S. Provisional Application No. 61/328,400 filed Apr. 27, 2010, the entirety of which is hereby incorporated by reference.

TECHNICAL FIELD

The disclosure relates to Session Initiation Protocol (SIP) sessions, and in particular to resolving race conditions in SIP sessions established through an intermediary.

BACKGROUND

With the growth of the networks and the Internet, Internet Protocol (IP) telephony is becoming increasingly popular. Often referred to as Voice over IP (VoIP), it can be used to establish communication between two end points.

In order to establish the communication, the two endpoints exchange messages in order to establish a dialog that describes the characteristics of the communication. The dialog may establish the type of media to be exchanged, for example video and/or audio as well as the protocol used to transfer the communication.

When two endpoints attempt to modify an existing dialog at approximately the same time, a race condition exists. The condition is often referred to as a glare condition, and can be resolved using a back-off time when the two endpoints establish the call between each other directly.

When an intermediary is used to establish the call between two endpoints, it may be difficult to resolve the glare condition. Various attempts of addressing this glare condition have been considered; however these have included modifying the Session Initiation Protocol (SIP) used to control VoIP calls. Therefore there is a need for an improved method and apparatus for addressing glare conditions in SIP.

BRIEF DESCRIPTION OF THE DRAWINGS

Reference will now be made, by way of example, to the accompanying drawings which show example embodiments of the present application, and in which.

DESCRIPTION

Embodiments are described below, by way of example only, with reference to FIGS. 1-6.

In one aspect, the present disclosure provides a method of resolving, at an intermediary server, a glare condition between two end points exchanging media, each endpoint having a session initiation protocol (SIP) dialog with the intermediary server, the intermediary server having the same ownership status of each SIP dialog. The method comprises receiving a first re-INVITE message from a first end point of the two end points; receiving a second re-INVITE message from a second end point of the two end points; sending a first 491 Request Pending message to the second endpoint in response to the received second re-INVITE message; receiving a second 491 Request Pending from the second endpoint; initiating a back-off period of time based on the ownership status of the second SIP dialog; and re-sending the first re-INVITE message to the second end point after expiry of the back-off period of time.

In another aspect, the present disclosure provides an apparatus for resolving a glare condition between two end points exchanging media, each endpoint having a session initiation protocol (SIP) dialog with the apparatus, the apparatus having the same ownership status of each SIP dialog. The apparatus comprises a memory for storing instructions; and a processor coupled to the memory for executing the instructions stored in the memory. The instructions configure the apparatus to receive a first re-INVITE message from a first end point of the two end points; receive a second re-INVITE message from a second end point of the two end points; send a first 491 Request Pending message to the second endpoint in response to the received second re-INVITE message; receive a second 491 Request Pending from the second endpoint; initiate a back-off period of time based on the ownership status of the second SIP dialog; and re-send the first re-INVITE message to the second end point after expiry of the back-off period of time.

In yet another aspect, the present disclosure provides a computer readable media storing instructions for execution by a processor, the instructions for implementing a method of resolving, at an intermediary server, a glare condition between two end points exchanging media, each endpoint having a session initiation protocol (SIP) dialog with the intermediary server, the intermediary server having the same ownership status of each SIP dialog. The method comprises receiving a first re-INVITE message from a first end point of the two end points; receiving a second re-INVITE message from a second end point of the two end points; sending a first 491 Request Pending message to the second endpoint in response to the received second re-INVITE message; receiving a second 491 Request Pending from the second endpoint; initiating a back-off period of time based on the ownership status of the second SIP dialog; and re-sending the first re-INVITE message to the second end point after expiry of the back-off period of time.

Other aspects of the present disclosure will be apparent to those of ordinary skill in the art from a review of the following detailed description in conjunction with the drawings. Embodiments of the present disclosure are not limited to any particular operating system, mobile device architecture, server architecture, or computer programming language.

The present disclosure relates to the control and management of communications. Although reference may be made to "calls" in the description of example embodiments below, it will be appreciated that the described systems and methods are applicable to session-based communications in general and not limited to voice calls.

Figure 1:
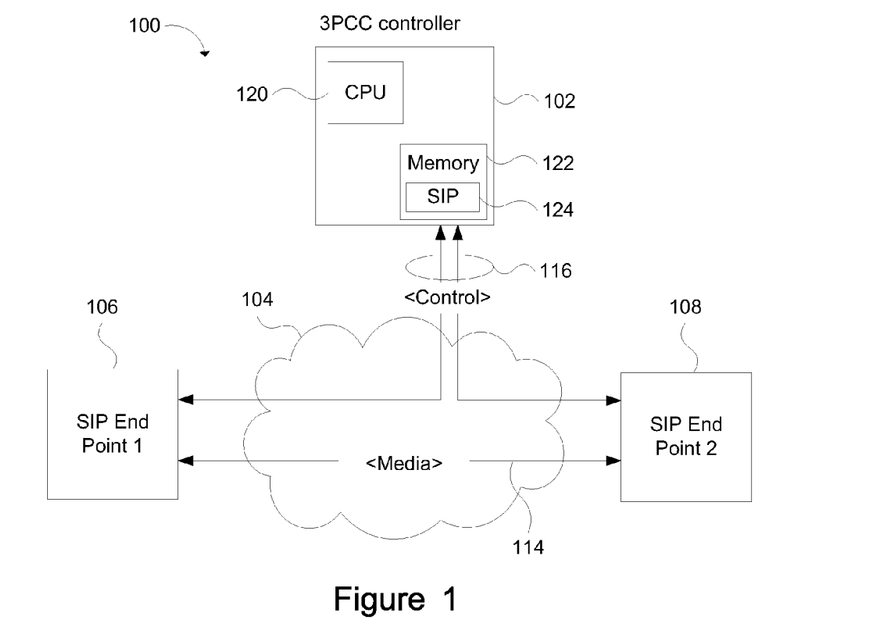
FIG. 1 is a block diagram of a system for establishing a call between two endpoints.

FIG. 1 is a block diagram of a system 100 for establishing a call between two endpoints. The term 'call' in this disclosure is broadly considered to include session based communication between two endpoints. As depicted in FIG. 1, a Third Party Call Control (3PCC) controller 102 comprises a central processing unit (CPU) 120 for executing instructions that are stored in the memory 122. The instructions configure the 3PCC controller 102 in order to provide the functionality described further herein, represented schematically as SIP instructions 124. The 3PCC controller 102 is coupled to a network 104. As will be understood, the network 104 may comprise a plurality of interconnected networks, such as local area networks (LANs). Also connected to the network 104 are two SIP end points, 106, 108. Each SIP endpoint 106, 108 may be, for example an IP phone or softphone provided on a computer. Additionally, or alternatively, the SIP endpoints may be a controller that provides some bridging functionality for bridging a SIP call with a non-IP phone. For example, a SIP endpoint may be provided by an IP-PBX that can connects to the PTSN.

A call can be established between two SIP end points through a third party. This is referred to as 3PCC. In 3PCC, the 3PCC controller 104 establishes respective SIP dialogs with each SIP end point by exchanging control messages 116 with the end points 106, 108. Each SIP dialog describes the characteristics of the call, and may be described in accordance with Session Description Protocol (SDP). SDP may be used to describe the media 114, for example audio and/or video streams, to exchange between the two end points. Once the dialogs have been established between the end points 106, 108 and the 3PCC controller 102, media 114 can be exchanged directly between the SIP end points 106, 108. Although the media 114 is described as being exchanged directly between the SIP endpoints, it will be appreciated that this is with regards to the 3PCC controller 102. That is the media 114 exchanged between the SIP endpoints 106, 108 may pass between various servers, routers, switches etc, however it does not need to pass through the 3 PCC controller 102.

Figure 2:
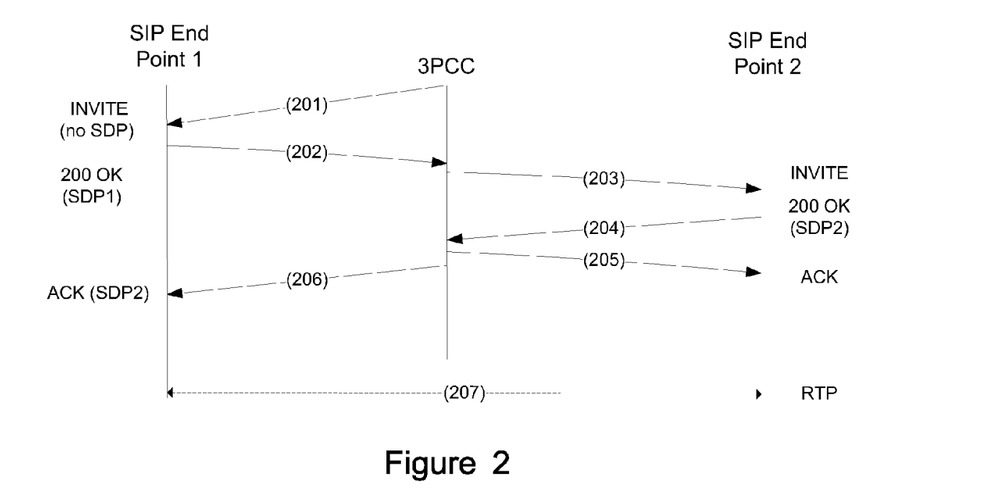
FIG. 2 depicts a flow of SIP messages between two endpoints and a 3PCC controller for establishing dialogs with each endpoint.

FIG. 2 depicts a flow of SIP messages between two endpoints 106, 108 and the 3PCC controller 102 for establishing dialogs with each endpoint, and causing media to be exchanged directly between the two endpoints. FIG. 2 depicts a 3PCC controller initiated call, in which the 3PCC controller initiates the dialog with each endpoint. As such the 3PCC controller 102 acts as the user agent client (UAC) for each dialog, and each endpoint 106, 108 acts as the user agent server (UAS). In this situation, the 3PCC controller 102 may be considered the owner of each dialog, since it initiated the dialogs. The 3PCC controller initiated calls may be used, for example, to provide click-to-dial functionality. Click-to-dial allows a user to click a phone number on a web page and have the web server (which would include a 3PCC controller) establish the call.

As depicted in FIG. 2, the 3PCC controller sends an INVITE message to the first SIP endpoint (201). The INVITE does not contain an SDP. The first SIP endpoint responds with a 200 OK message (202), assuming the party wishes to establish the call. The 200 OK message includes an offer from the SIP endpoint. The offer specifies the characteristics of the call the endpoint wishes to establish. The offer may be described using Session Description Protocol (SDP) and may include information about different content streams such as the type of media, codecs used, locations and ports of the stream, etc. The particular offer is depicted as 'SDP1' in FIG. 2. The requirements of defining an offer using SDP are described in RFC 2327, which is hereby incorporated by reference in its entirety. The 3PCC controller receives the offer from the first SIP endpoint and sends an INVITE message to the second SIP endpoint (203). The second INVITE includes the offer sent from the first SIP endpoint, 'SDP1'. The second SIP endpoint receives the INVITE and, assuming the party wishes to establish the call, responds with a 200 OK message (204). The 200 OK message includes an answer to the offer received in the INVITE. The answer, similar to an offer, specifies the characteristics of the call the endpoint is willing and/or able to establish. The answer may be described in accordance with SDP, and is depicted as 'SDP2' in FIG. 2. The 3PCC controller sends an ACK message back to the second SIP endpoint (205). After receiving the answer, 'SDP2', from the second SIP endpoint, the 3PCC controller responds to the first 200 OK message initially sent from the first endpoint with an ACK message (206). The ACK message includes the answer, 'SDP2', from the second SIP endpoint. Each endpoint now has the call characteristics the other endpoint can establish, such as the location of a media stream, and so an exchange of media between the two endpoints can be established. The media may be exchanged using real-time transport protocol (RTP) messages (207) as depicted. However, other types of messages can be exchanged if described in the respective SDPs sent by the endpoints.

The message flow of FIG. 2 depicts one possible way of establishing a call between two SIP endpoints through a 3PCC controller. It will be appreciated that other message flows are possible. Furthermore, the call does not need to be initiated by the 3PCC controller and may be initiated by one, or both, of the endpoints initiating a dialog with the 3PCC controller.

Once a SIP call has been established between two endpoints, either endpoint may attempt to modify the characteristics by sending a re-INVITE message that includes a new SDP description. The other endpoint may accept the modification by sending a 200 OK message that includes its SDP. This may be used, for example, to provide music-on-hold functionality.

A problem may arise when both endpoints attempt to modify the characteristics at the same time, for example both endpoints send re-INVITE messages at the same time, or before receiving the re-INVITE from the other endpoint. This is referred to as a glare condition, and can be addressed using a 491 Request Pending message. Upon receiving a 491 Request Pending message, a SIP end point will wait a period of time, referred to as the back-off time period, before retrying the re-INVITE. In order to ensure that the two SIP endpoints do not retry the re-INVITE at the same time, the back-off time period used by each endpoint is determined based on ownership status of the SIP dialog. That is, if the SIP end point owns, or initiated, the dialog. If the SIP endpoint did not initiate the call, the back-off time is selected between 0 and 2 seconds. If the SIP endpoint initiated the call the back-off time is selected between 2.1 and 4 seconds. This works well as long as the ownership of the dialogs is different for each endpoint. However, in 3PCC, the ownership of each dialog may be the same at each endpoint.

Figure 3:
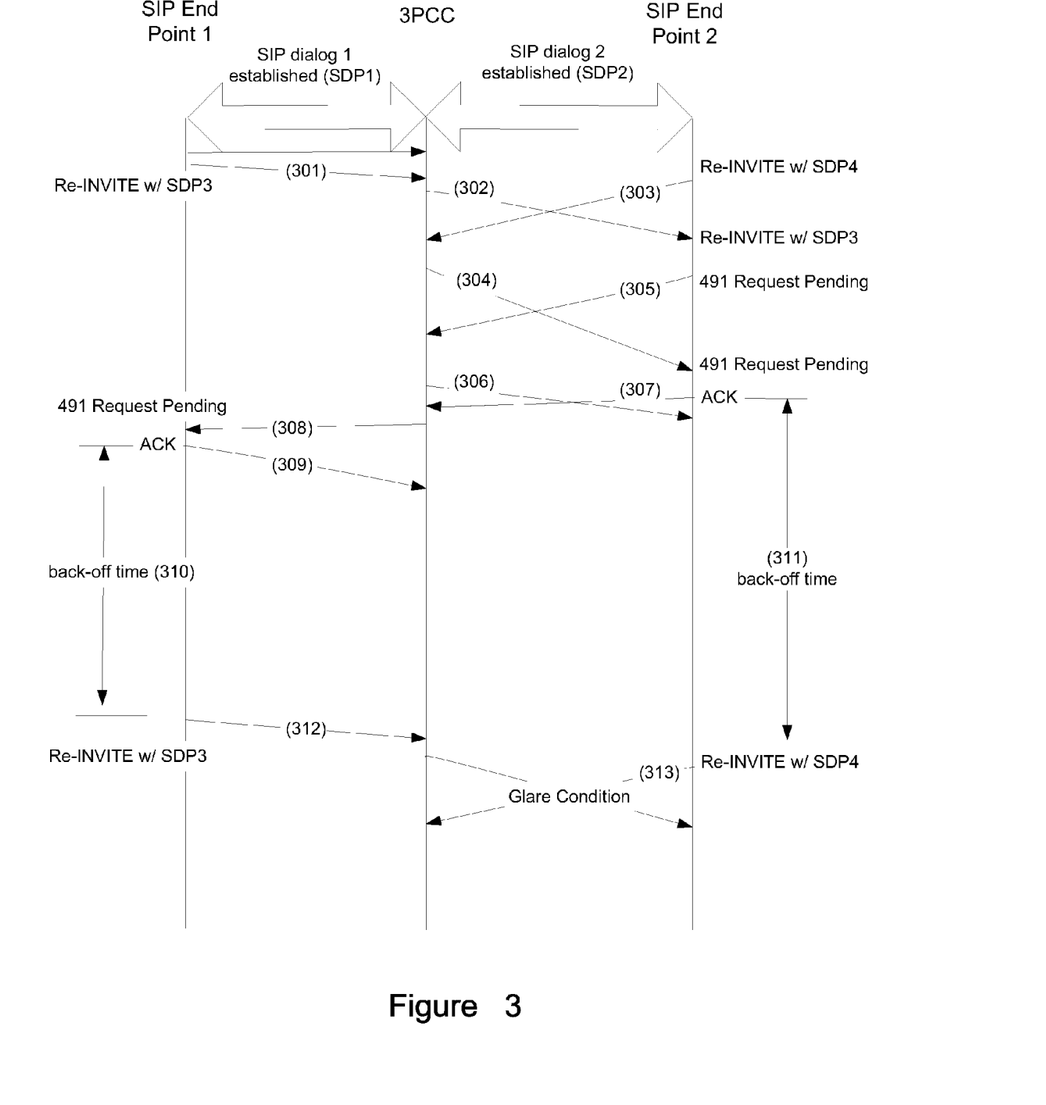
FIG. 3 depicts in a message flow diagram, a message flow in which a glare condition is not successfully resolved.

FIG. 3 depicts in a message flow diagram, a message flow in which the glare condition is not successfully resolved. In this example, it is assumed that the 3PCC controller has initiated the call with the two endpoints, and as such the endpoints have the same ownership status. It will be appreciated that the same situation applies if both endpoints had initiated the call and so both owned their respective SIP dialogs.

As seen in FIG. 3, after the two SIP dialogs have been established, both endpoints attempt to modify the characteristics by sending a re-INVITE message to the 3PCC controller. The first SIP endpoint sends a re-INVITE message (301) with a new offer specifying the new characteristics ('SDP3'). The 3PCC controller forwards the re-INVITE request with SDP3 onto the second end point (302). However, before the re-INVITE (SDP3) arrives at the second endpoint, the second endpoint also sends a re-INVITE message (303). The re-INVITE message sent from the second endpoint includes a new offer specifying the new characteristics ('SDP4'). The 3PCC controller receives the re-INVITE (SDP4) message from the second SIP endpoint before receiving the expected 200 OK message. As such, the 3PCC controller sends a 491 Request Pending message (304) to the second SIP endpoint, which the second SIP endpoint responds to with an ACK (306). Similarly, the second SIP endpoint receives the re-INVITE (SDP3) prior to receiving the expected 200 OK message, and so sends a 491 Request Pending message (305) to the 3PCC controller. The 3PCC controller sends an ACK (307) back to the second SIP endpoint and forwards the 491 Request Pending message (308) onto the first SIP endpoint. The first SIP endpoint sends an ACK message (309) back to the 3PCC controller.

Upon receiving the 491 Request Pending messages both the SIP end points initiate a back-off time (310), (311). However since both dialogs between the endpoints and the 3PCC controller are owned by the 3PCC controller, the back-off time is selected from within the same interval. As such, the back-off time selected by each end-point may be the same, either because, the SIP endpoint does not select a random back-off time, or because the randomly selected back-off time selected by each endpoint happens to be the same. After the back-off time has expired, each endpoint retries the respective re-INVITE message (312), (313). This results in the same glare condition existing.

Figure 4:
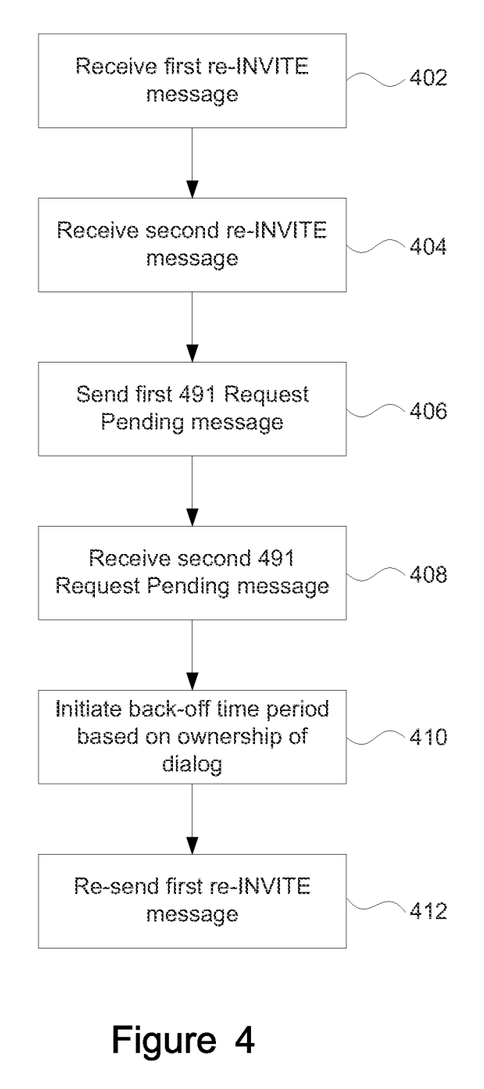
FIG. 4 depicts in a flow diagram a method of resolving a race condition such as a glare condition at 3PCC controller.

FIG. 4 depicts in a flow diagram an illustrative method of resolving a race condition such as a glare condition at 3PCC controller. The 3PCC controller 102 receives a first re-INVITE message from a first end point 104 (402) and then receives a second re-INVITE message from a second endpoint 106 (404) prior to receiving a 200 OK message from the second end point in response to the first re-INVITE message. A first 491 Request Pending message is sent (406) to the second endpoint 106 in response to receiving the second re-INVITE message prior to the expected 200 OK message. A second 491 Request Pending message is received (408) at the 3PCC controller 102 from the second endpoint 106. Instead of forwarding the 491 Request Pending message onto the first SIP endpoint 104, the 3PCC controller 102 initiates a back-off time period (410) according to the ownership status of the dialog between the 3PCC controller 102 and the second SIP endpoint 104. After the back-off time has expired, the 3PCC controller 102 retries sending the first re-INVITE to the second SIP endpoint 106.

The method as described above resolves the glare condition at a 3PCC controller. Since the 3PCC controller 102 and the second endpoint 106 will not have the same ownership state of the dialog, as it is not possible for both the second endpoint and the 3PCC controller to have initiated the dialog, each will select a back-off time from a different time window as required by SIP.

Figure 5:
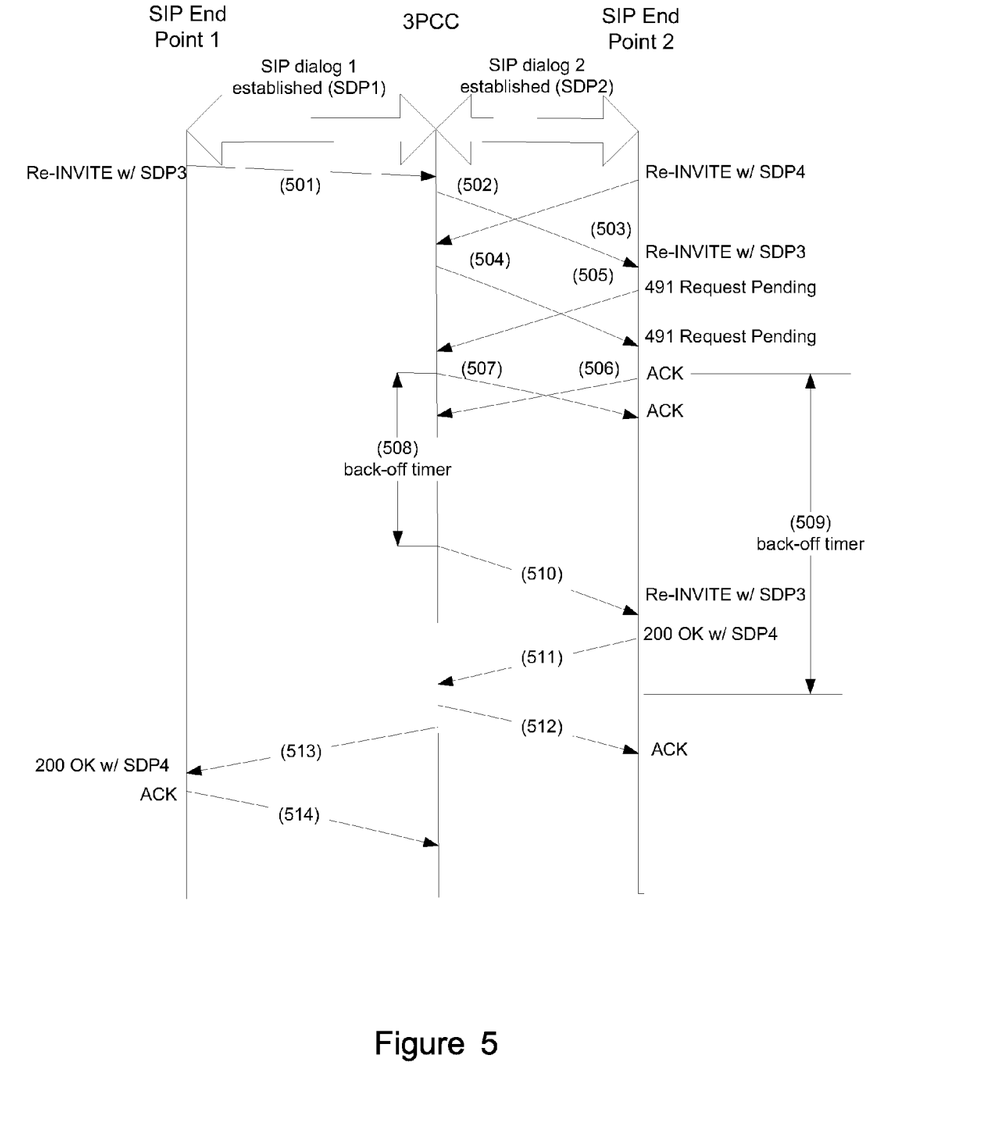
FIG. 5 depicts in a message flow, the messages between two SIP endpoints and a 3PCC controller for resolving a glare condition.

FIG. 5 depicts in a message flow, the messages between two SIP endpoints and a 3PCC controller for resolving a re-INVITE glare condition. The beginning of the message flow depicted in FIG. 5 is similar to that described above with reference to FIG. 3. After the two SIP dialogs have been established, both endpoints attempt to modify the characteristics by sending a re-INVITE message to the 3PCC controller. The first SIP endpoint sends a re-INVITE message (501) with a new offer specifying the new characteristics ('SDP3'). The 3PCC controller forwards the re-INVITE request with SDP3 onto the second end point (502). However, before the re-INVITE (SDP3) arrives at the second endpoint, the second endpoint also sends a re-INVITE message (503). The re-INVITE message sent from the second SIP endpoint includes a new offer specifying the new characteristics ('SDP4'). The 3PCC controller receives the re-INVITE (SDP4) message from the second SIP endpoint before receiving the expected 200 OK message. As such, the 3PCC controller sends a 491 Request Pending message (504) to the second SIP endpoint, which the second SIP endpoint responds to with an ACK (506). Similarly, the second SIP endpoint receives the re-INVITE (SDP3) prior to receiving the expected 200 OK message, and so sends a 491 Request Pending message (505) to the 3PCC controller. The 3PCC controller sends an ACK (507) back to the second SIP endpoint. However, unlike the message flow of FIG. 3, the 3PCC controller does not forward the 491 Request Pending message on to the first SIP end point. Instead, as described above with reference to FIG. 4, the 3PCC controller initiates a back-off time period (508) upon sending the ACK message to the received 491 Request Pending message. Similarly, upon sending the ACK message to the 3PCC controller, the second endpoint initiates a back-off time period (509). Upon expiry of the back-off time, the re-INVITE will be sent. In the example of FIG. 5, it is assumed that the 3PCC controller initiated the dialog with the second SIP endpoint, and so should re-try the re-INVITE after between 2.1 and 4 seconds in units of 10 ms. Since the second endpoint did not initiate the dialog with the 3PCC controller, it will wait for between 0 and 2 seconds in units of 10 ms before retrying the re-INVITE. As such, the 3PCC controller will resend the re-INVITE (SDP3) to the second SIP endpoint (510). This re-INVITE (SDP3) will be received at the second endpoint before it attempts to resend its re-INVITE (SDP4). As such the glare condition is resolved. The second SIP endpoint responds to the re-INVITE (SDP3) with a 200 OK message that includes SDP4 (511), which is received at the 3PCC controller. The 3PCC controller sends an ACK message (512) to the second endpoint and sends the 200 OK message with SDP4 to the first endpoint (513). The first endpoint responds to the 200 OK message with an ACK message (514).

The system and methods described above can advantageously provide shorter audio recovery times when resolving glare conditions at a 3PCC controller. Furthermore, the method does not require modification to SIP endpoints, and as such, as long as the SIP endpoints correctly implement the SIP protocol, the glare conditions can be resolved.

As will be appreciated, the 3PCC controller apparatus and method described above may be implemented in various environments. For example, a web server that provides click-to-dial functionality may include the 3PCC controller functionality described herein. Additionally, or alternatively, the 3PCC controller functionality may be included in an enterprise network that provides for the control and management of communications.

Figure 6:
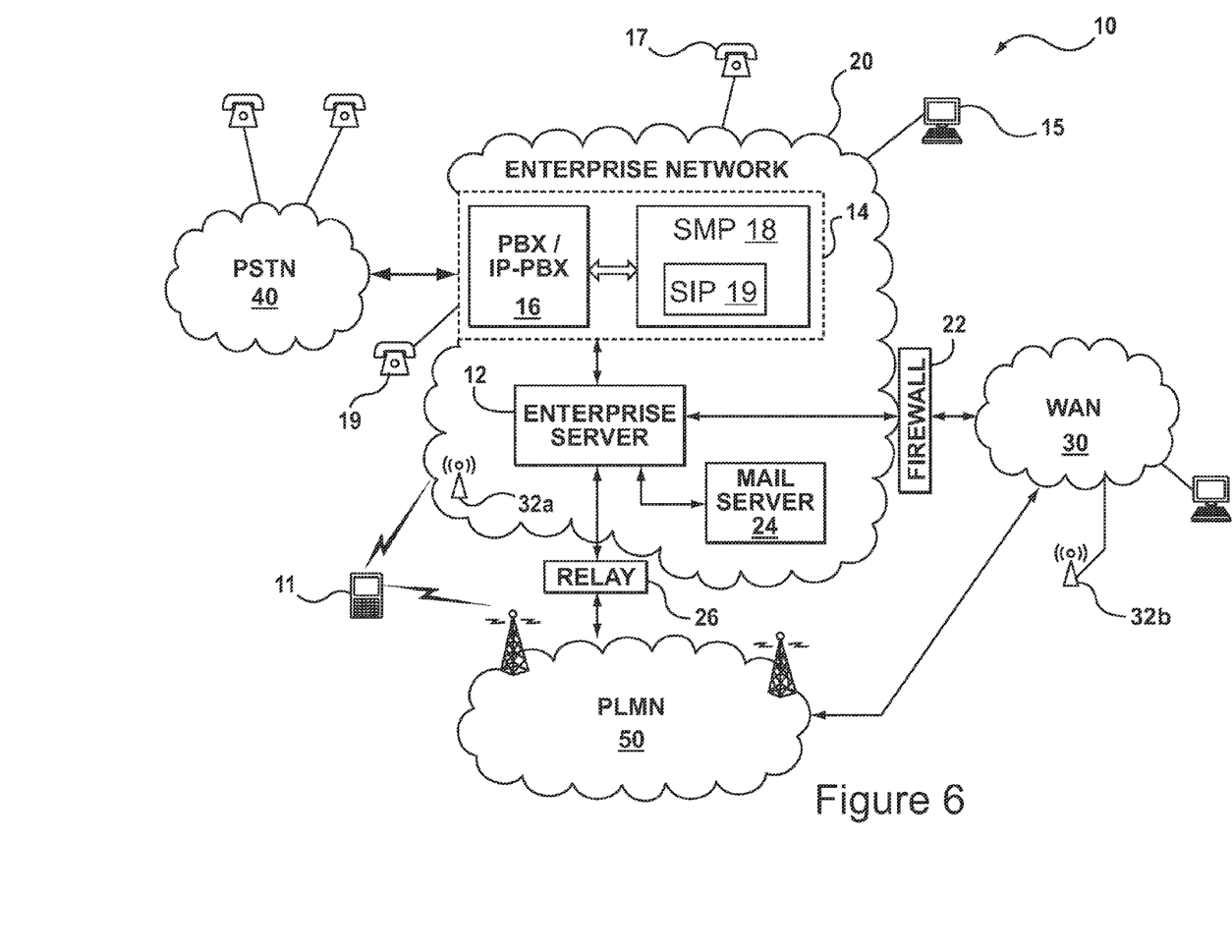
FIG. 6 shows, in block diagram form, an example system for managing enterprise-related mobile calls, including an enterprise communications platform.

FIG. 6 shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EVDO, HSPA, 3GPP, LTE or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signalling protocols for setting up and tearing down circuit-switched connections through the PSTN 40 and related signalling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls. The PBX 16 may provide the SIP endpoints described above and bridge them with external, or internal communication devices such as phones connected to PSTN 40.

The enterprise network 20 may further include a Service Management Platform (SMP) 18 for performing some aspects of messaging or session control, like call control and advanced call processing features. The SMP 18 may implement the 3PCC controller functionality described above 19. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Certain adaptations and modifications of the described embodiments can be made. Therefore, the above discussed embodiments are considered to be illustrative and not restrictive.

The invention claimed is:

1. A method at an intermediary server, between two end points exchanging media, the method comprising:
    receiving, at the intermediary server, a first re-INVITE message from a first end point of the two end points, wherein the first end point has a first session initiation protocol (SIP) dialog with the intermediary server having an associated ownership status, the first SIP dialog established using first session description protocol characteristics (SPD1);
    receiving, at the intermediary server, a second re-INVITE message from a second end point of the two end points causing a glare condition between the two end points, wherein the second end point has a second SIP dialog with the intermediary server having the same associated ownership status as the first SIP dialog, the second SIP dialog established using second session description protocol characteristics (SPD2);
    sending, from the intermediary server, a first 491 Request Pending message to the second endpoint in response to the received second re-INVITE message;
    receiving, at the intermediary server, a second 491 Request Pending from the second endpoint;
    initiating, at the intermediary server, a back-off period of time based on the ownership status of the second SIP dialog; and
    re-sending, from the intermediary server, the first re-INVITE message to the second end point after expiry of the back-off period of time.

2. The method of claim 1, wherein the second re-INVITE message is received prior to receiving a 200 OK message from the second end point in response to the first re-INVITE message.

3. The method of claim 1, further comprising sending the first re-INVITE message received from the first endpoint to the second endpoint.

4. The method of claim 3, further comprising:
    receiving the first re-INVITE message at the second endpoint prior to receiving a 200 OK message in response to the second re-INVITE message; and
    sending the second 491 Request Pending message in response to the received first re-INVITE message.

5. The method of claim 1, further comprising
    sending an ACK message to the second endpoint in response to the second 491 Request Pending message.

6. The method of claim 1, further comprising:
    receiving a 200 OK message from the second endpoint; and
    sending the 200 OK message to the first endpoint.

7. The method of claim 6, further comprising:
    sending an ACK message to the second endpoint in response to the 200 OK message; and
    receiving an ACK message from the first endpoint in response to the 200 OK message.

8. The method of claim 1 wherein the intermediary server is the owner of both SIP dialogs between the first endpoint and the second endpoint.

9. The method of claim 8, wherein the intermediary server selects a back off time value randomly between 2.1 and 4 second in units of 10 ms.

10. The method of claim 1 wherein the intermediary server is not the owner of either of the SIP dialogs between the first endpoint and the second endpoint.

11. The method of claim 10 wherein the intermediary server selects a back off time value randomly between 0 and 2 second in units of 10 ms.

12. The method of claim 6, wherein the first re-INVITE message defines new SDP characteristics (SDP3) for the first SIP dialog, the second re-INVITE message defines new SDP characteristics (SDP4) for the second SIP dialog and the 200 OK message includes SDP4.

13. An apparatus between two end points exchanging media, the apparatus comprising:
    a memory for storing instructions; and
    a processor coupled to the memory for executing the instructions stored in the memory, the instructions configuring the apparatus to:
    receive a first re-INVITE message from a first end point of the two end points, wherein the first end point has a first session initiation protocol (SIP) dialog with the intermediary server having an associated ownership status, the first SIP dialog established using first session protocol characteristics (SPD1);
    receive a second re-INVITE message from a second end point of the two end points causing a glare condition between the two end points, wherein the second end point has a second SIP dialog with the intermediary server having the same associated ownership status as the first SIP dialog, the second SIP dialog established using second session protocol characteristics (SPD2);
    send a first 491 Request Pending message to the second endpoint in response to the received second re-INVITE message;
    receive a second 491 Request Pending from the second endpoint;
    initiate a back-off period of time based on the ownership status of the second SIP dialog; and
    re-send the first re-INVITE message to the second end point after expiry of the back-off period of time.

14. The apparatus of claim 13, wherein the second re-INVITE message is received prior to receiving a 200 OK message from the second end point in response to the first re-INVITE message.

15. The apparatus of claim 13, wherein the instructions further configure the apparatus to send the first re-INVITE message received from the first endpoint to the second endpoint.

16. The apparatus of claim 15, wherein the instructions further configure the apparatus to:
   receive the first re-INVITE message at the second endpoint prior to receiving a 200 OK message in response to the second re-INVITE message; and
   send the second 491 Request Pending message in response to the received first re-INVITE message.

17. The apparatus of claim 13, wherein the instructions further configure the apparatus to:
   send an ACK message to the second endpoint in response to the second 491 Request Pending message.

18. The apparatus of claim 13, wherein the instructions further configure the apparatus to:
   receive a 200 OK message from the second endpoint; and
   send the 200 OK message to the first endpoint.

19. The apparatus of claim 18, wherein the instructions further configure the apparatus to:
   send an ACK message to the second endpoint in response to the 200 OK message; and
   receive an ACK message from the first endpoint in response to the 200 OK message.

20. The apparatus of claim 18, wherein the first re-INVITE message defines new SDP characteristics (SDP3) for the first SIP dialog, the second re-INVITE message defines new SDP characteristics (SPD4) for the second SIP dialog (SDP2) and the 200 OK message includes SDP4.

21. The apparatus of claim 13 wherein the intermediary server is the owner of both SIP dialogs between the first endpoint and the second endpoint.

22. The apparatus of claim 21, wherein the intermediary server selects a back off time value randomly between 2.1 and 4 second in units of 10 ms.

23. The apparatus of claim 13 wherein the intermediary server is not the owner of either of the SIP dialogs between the first endpoint and the second endpoint.

24. The apparatus of claim 23 wherein the intermediary server selects a back off time value randomly between 0 and 2 second in units of 10 ms.

25. A non-transitory computer readable memory storing instructions for execution by a processor, the instructions for implementing a method at an intermediary server the method comprising:
   receiving, at the intermediary server, a first re-INVITE message from a first end point of the two end points, wherein the first end point has a first session initiation protocol (SIP) dialog with the intermediary server having an associated ownership status, the first SIP dialog established using first session description protocol characteristics (SPD1);
   receiving, at the intermediary server, a second re-INVITE message from a second end point of the two end points causing a glare condition between the two end points, wherein the second end point has a second SIP dialog with the intermediary server having the same associated ownership status as the first SIP dialog, the second SIP dialog established using second session description protocol characteristics (SPD2);
   sending, from the intermediary server, a first 491 Request Pending message to the second endpoint in response to the received second re-INVITE message;
   receiving, at the intermediary server, a second 491 Request Pending from the second endpoint;
   initiating, at the intermediary server, a back-off period of time based on the ownership status of the second SIP dialog; and
   re-sending, from the intermediary server, the first re-INVITE message to the second end point after expiry of the back-off period of time,
   thereby resolving a glare condition between the two end points.

* * * * *